United States Patent [19]
Allwood

[11] 3,991,544
[45] Nov. 16, 1976

[54] CROP GATHERING MACHINE

[75] Inventor: John Allwood, North Parramatta, Australia

[73] Assignee: Grasslands Pty. Limited, Villawood, Australia

[22] Filed: June 5, 1975

[21] Appl. No.: 584,370

[30] Foreign Application Priority Data
June 7, 1974 Australia................................ 7820/74

[52] U.S. Cl. ................................................. 56/344
[51] Int. Cl.² ......................................... A01D 87/12
[58] Field of Search ........................... 56/344–351, 56/364, 341; 214/518–523

[56] References Cited
UNITED STATES PATENTS

| | | | |
|---|---|---|---|
| 3,732,672 | 5/1973 | Adee et al. | 56/344 |
| 3,751,892 | 8/1973 | Quanbeck | 56/350 |
| 3,754,388 | 8/1973 | Neely, Jr. | 56/346 |
| 3,886,719 | 6/1975 | Garrison et al. | 56/344 |

Primary Examiner—Russell R. Kinsey
Attorney, Agent, or Firm—Haseltine, Lake & Waters

[57] ABSTRACT

A crop gathering machine comprising a pick-up unit adapted to pick up previously cut crop and to discharge the same rearwardly through an outlet thereof. A container having an elevatable roof is coupled to the pick-up unit and is disposed rearwardly thereof such that the crop can be discharged into the container through the top thereof when the roof is elevated. A receiver with a pressurizing mechanism is positioned in front of the container and is operable to continuously receive discharged crop and force it into the container through a front opening therein. A guide mechanism is associated with a chute for selectively directing the discharged crop into the top of the container or into the receiver.

7 Claims, 7 Drawing Figures

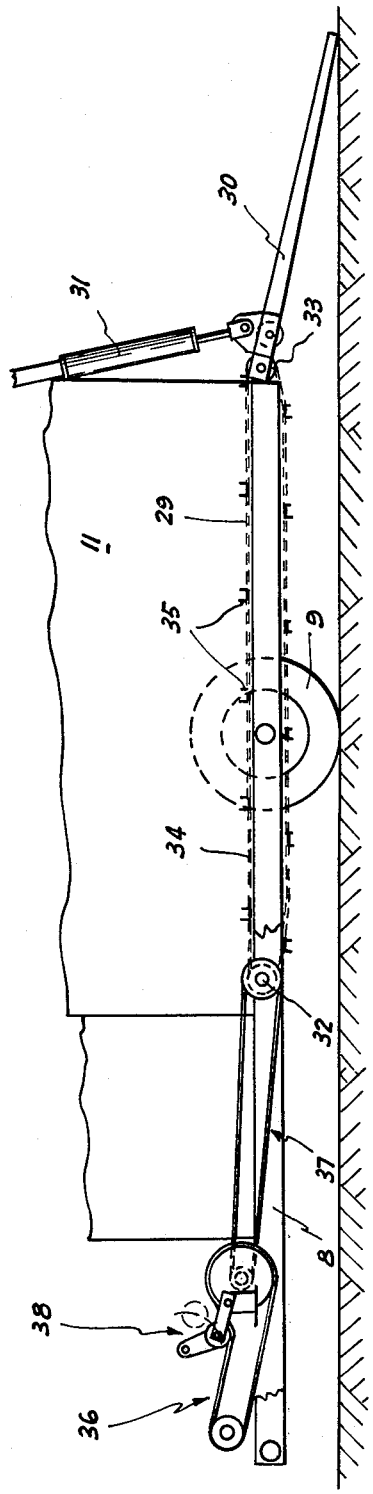
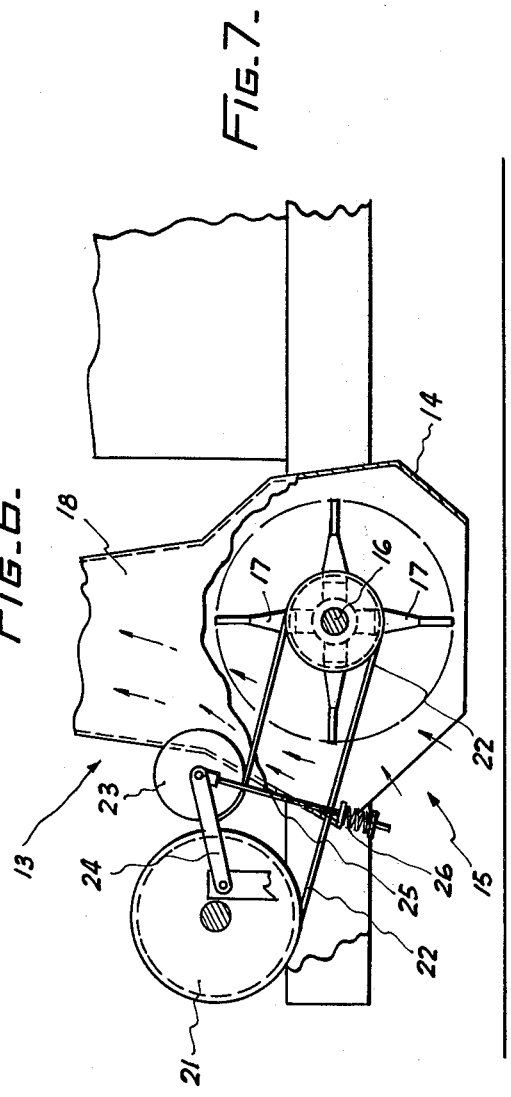

CROP GATHERING MACHINE

This invention relates to mobile crop gathering machines of the kind which include means for collecting a crop and a container into which the collected crop is discharged.

More particularly, the invention relates to machines of the above kind which include means for compressing the picked up crop in the container so that ultimately it may be discharged from the container as a self-sustaining stack.

The containers of such prior known crop gatherers have been furnished with a movable roof which by hydraulic cylinders or the like is pressed downwardly onto loose crop in the container to compress it. Thus the compressing step has required the unit as a whole to be brought to a halt (as further crop cannot be fed into the container while crop already therein is being compressed) and an object of the present invention is to overcome that deficiency of prior art machines.

A further object of the invention is to provide a finished stack of which the upper layers are well adapted to shed rain so as to preserve the stack as a whole.

According to the invention, a crop gathering machine is provided comprising means for collecting and discharging a crop, a container for holding the gathered crop in a stack, pressure charging means adapted to force crop into the container through an opening therein and control means associated with said collecting means whereby the crop discharged from said collecting means may be directed onto said stack and into said charging means in selected proportions.

Preferably, the collecting means includes a chute from which the crop is discharged and the container has an elevatable roof such that crop discharged from the chute may be directed onto the stack when the roof is elevated.

By way of example, an embodiment of the above-described invention is described hereinafter with reference to the accompanying drawings. These drawings illustrate a crop gathering machine of the abovementioned preferred form incorporating a discharge chute and a container with an elevatable roof.

FIG. 6 is a view taken on line 6—6 of FIG. 3 showing a bottom portion of the machine in a situation when the container is being emptied.

FIG. 7 is a view taken on line 7—7 of FIG. 3 drawn on a larger scale.

Figure 1:
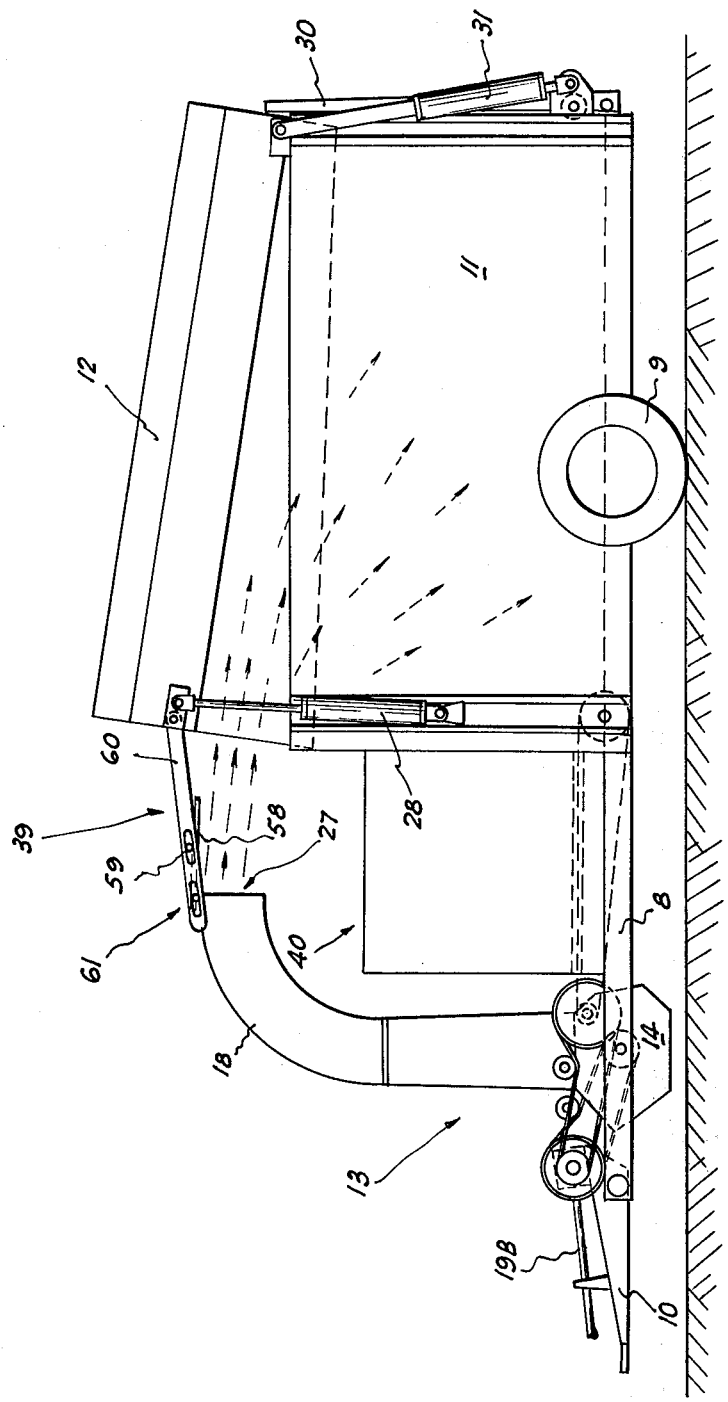
FIG. 1 is a side elevation of a crop gathering machine according to the invention with its container roof in an elevated position.

The illustrated embodiment of the invention is a machine adapted to be towed by an agricultural tractor or other towing vehicle furnished with both mechanical and hydraulic power outputs for powering mechanisms on the towed machine. It will be appreciated however, that in other embodiments of the invention the machine itself may be furnished with a prime mover and may be self-propelling under the control of an operator riding on it.

The illustrated machine comprises a substantial chassis 8, fabricated from rolled steel sections or the like, furnished with ground wheels 9 and a forwardly projecting hitch tongue 10 adapted for connection to the towbar of a towing vehicle.

The chasses 8 carries a boxlike container 11 with an elevatable roof 12, both of which may comprise a frame fabricated from rolled steel or tubular elements clad with sheet-metal outer panels.

Near the front of the chassis 8 there is a compressing unit 13 comprising a transversely extending flail box 14 having a lower front opening 15 and enclosing a flail shaft 16 carrying a plurality of radially extending beater flails 17, and an upwardly extending discharge chute 18.

The flail shaft 16 is power-driven from the towing tractor by way of a gear-box 19 with its output shaft 20 connected to the driving pulley 21 of a multiple V-belt power transmission comprising a plurality of V-belts 22 riding upon the pulley 21 and a driven pulley on the shaft 16. The V-belts 22 are tensioned by a tensioning pully 23 mounted on a swinging arm 24 and loaded against the V-belt 22 by way of a pull rod 25 and loading spring 26.

The gear-box 19, or rather its input shaft 19A, is connected by way of a power take-off shaft 19B to the mechanical power outlet of the towing vehicle.

The arrangement is such that the rotating flails 17 engage against previously cut crop when the machine is towed over that crop to lift it and fling it upwardly through the chute 18 for discharge through the rearwardly directed outlet 27 thereof.

The roof 12 may be elevated by hydraulic cylinders 28 fed with pressurized hydraulic fluid through manually operable control valves and hoses from the towing vehicle. When fed with fluid the cylinders extend (see FIG. 1) to tilt the roof 12 upwardly about hinge connections between the roof and the container 11 at the rear end of the roof.

When the container 11 is filled with compressed crop the mass of crop in the container may be discharged rearwardly by means of a slat and chain conveyor 29 set in the floor of the container.

To permit such discharge the rear wall 30 of the container 11 must be swung from a closed position as seen in FIG. 1 to an open position as seen in FIG. 6 by means of hydraulically powered cylinders 31.

The conveyor 29 comprises a front shaft 32, rear shaft 33, endless chains 34 riding about front and rear sprockets on the respective shafts 32 and 33 and a plurality of slats 35 extending from one chain 34 to the other.

The front shaft 32 is driven from the gear-box outlet shaft 20 by way of a single V-belt drive transmission 36 and an endless chain transmission 37. The conveyor 29 is only required to operate intermittently and this may be achieved by means of a clutch pulley 38 able to be shifted manually from an operating position wherein it tensions the V-belt of drive 36 to an non-operating position wherein tension in the belt is slackened so that slip occurs.

Insofar as it has been described already the illustrated machine is conventional and, thus, a more detailed description is not required to enable an appropriately skilled person to comprehend its construction and mode of operation. However, in accordance with the invention the machine is furnished with directional guide means 39 and pressure charging means 40 and these will be described in more detail.

The pressure charging means 40 comprises an open-topped generally semi-cylindrical hopper 41 projecting forwardly from the front of the container 11. A bottom portion of the hopper 41 is in free communication with the interior of the container 11 by way of a crop inlet opening in the front wall of the container 11.

That bottom portion of the hopper 41 has a fabricated steel ram element 42 mounted in it. The ram element 42 is a fabricated steel cylindrical sector having an outer curved surface 43 conforming closely to a correspondingly curved wall 44 of the said bottom portion of the hopper 40 and two radially extending crop compressing walls 45.

The ram element 42 is fixed to an upright sleeve 46 which is itself fixed at each end to an oscillating shaft 47 mounted in bearings 48 and 49. The shaft 47 is co-axial with the axis of the cylinder of which the ram element 42 is a sector.

The shaft 47 has webs 50 projecting from it supporting a crank pin 51 joined by a connecting rod 52 to a second crank pin 53 of a crank arm 54 on the ouput shaft 55 of a conventional hydraulic motor 56.

The proportions of the arm 54 and crank webs 50 are such that rotation of the arm 54 causes the crank webs 50 to oscillate to and fro to cause the ram element 42 to oscillate likewise.

Crop fed into the open top of the hopper 40 is guided by inclined guides 57 so as to fall into that part of the lower portion of the hopper which is not at the time being occupied by the ram element 42. Thus, it will be apparent that as the ram oscillates to and fro it loads successive charges of crop rearwardly into the container 11 and there is sufficient torque from the motor 56 to effect substantial compression of the crop in that container.

Figure 2:
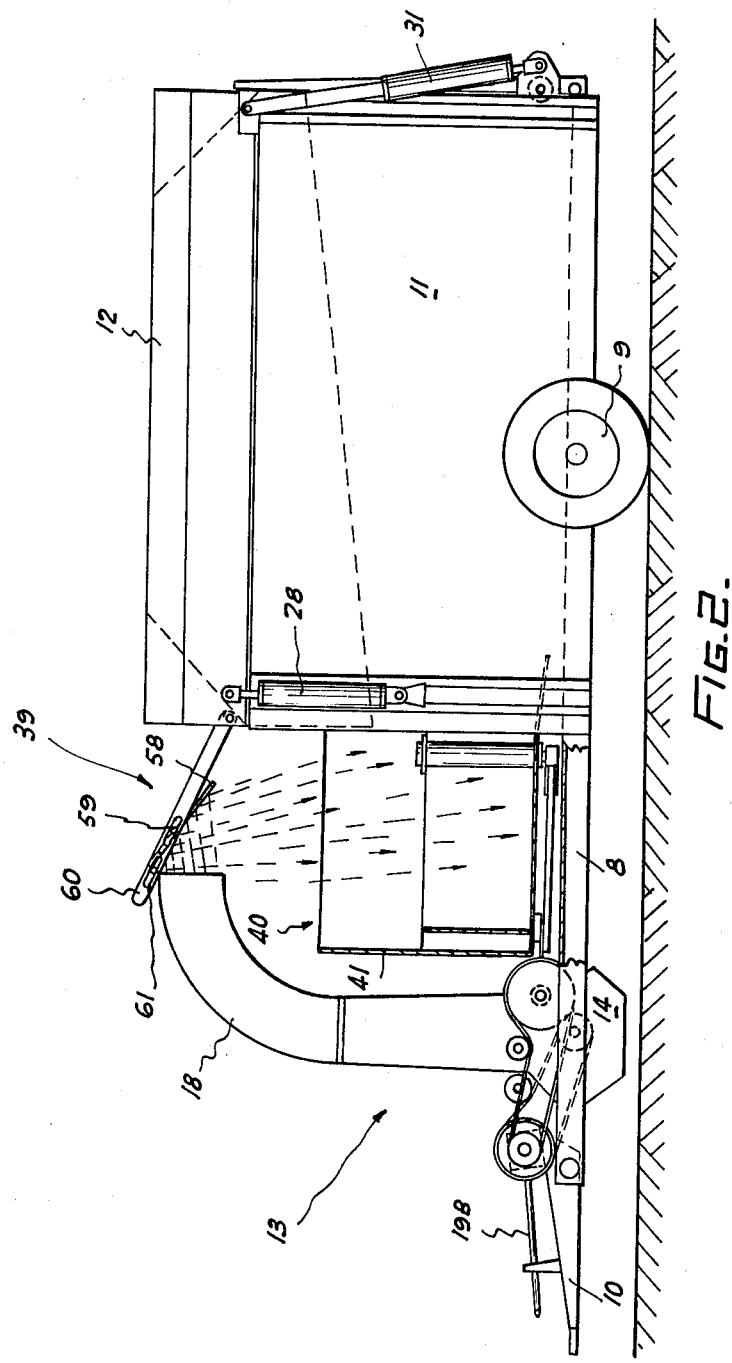
FIG. 2 is a view similar to FIG. 1 of the same machine with its container roof in the lowered position.
Figure 3:
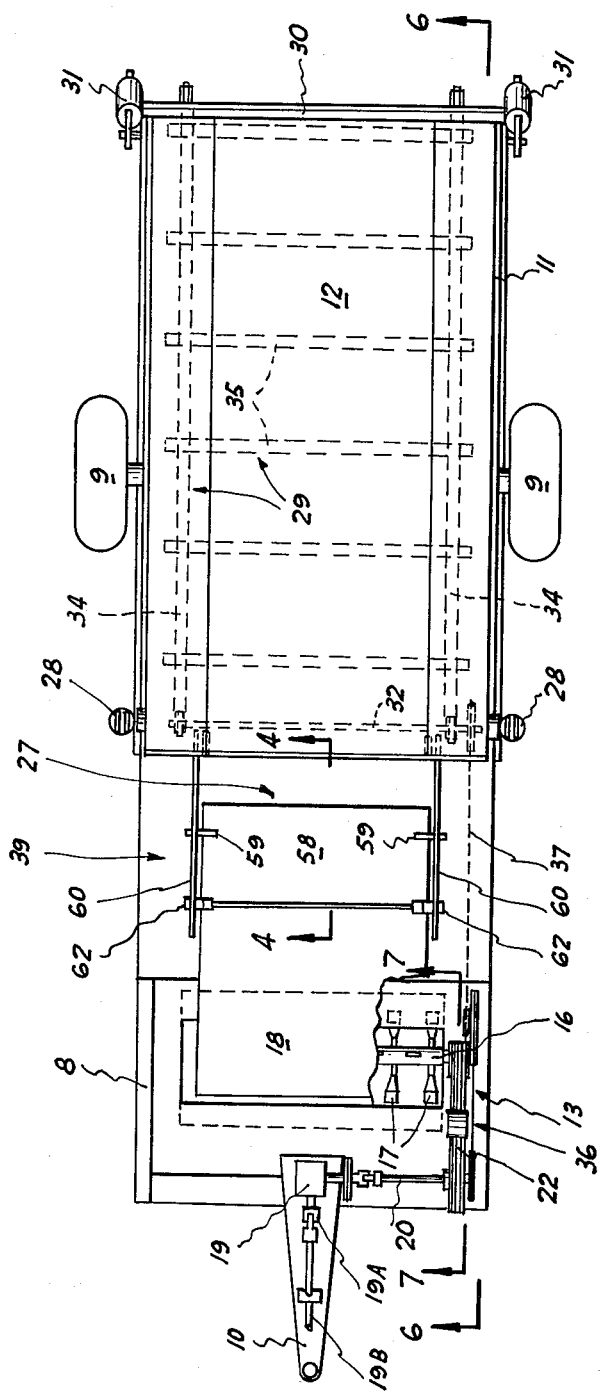
FIG. 3 is a plan view of the machine of FIG. 1 with part of its discharge chute cut away to show internal components.
Figure 4:
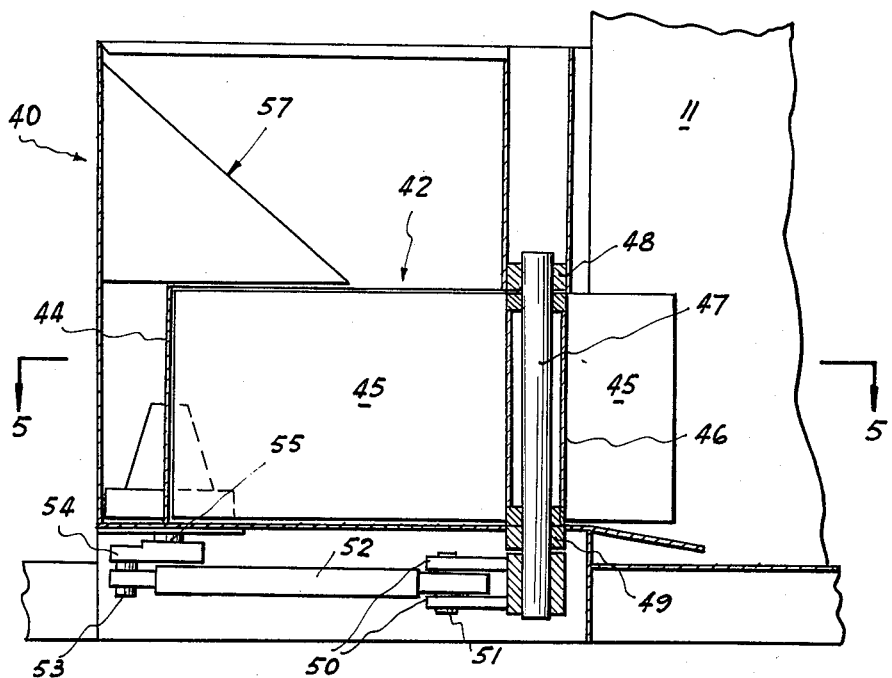
FIG. 4 is a sectional view taken on line 4—4 of FIG. 3 drawn on a larger scale.
Figure 5:
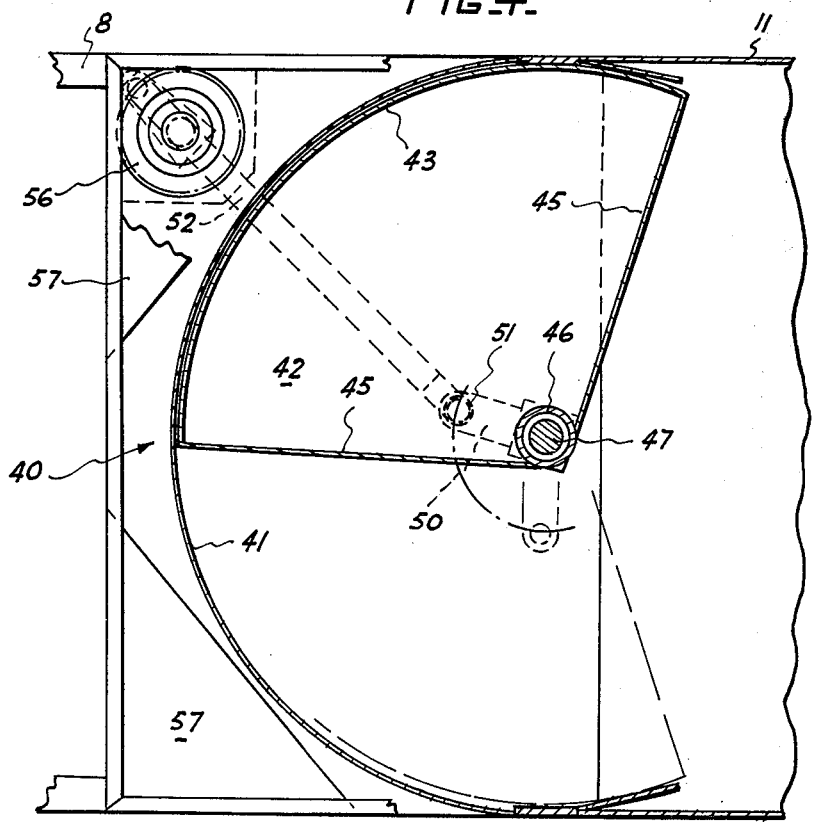
FIG. 5 is a sectional view taken on line 5—5 of FIG. 4.

In the illustrated embodiment of the invention the directional guide means 39 comprises a deflector vane 58 secured in a positionally adjustable manner at 59 to side bars 60. Each side bar 60 is pivoted at its rear end to the front of the container roof 12 and is slotted at 61 for engagement with two bearing pins 62 on the chute 18. The arrangement is such that as the roof 12 is raised the deflector vane 58 is lifted out of the path of the crop being discharged from the chute 18 which, thus, may pass into the container 11 through its open top. (See the arrows indicating the discharged crop in FIG. 1). When the roof 12 is lowered the vane 58 comes into the path of the crop and deflects it downwardly into the hopper 40 as shown in FIG. 2.

In other embodiments of the invention the directional guide means may be operated independently of the container roof but obviously it is more convenient to have the operation of those components linked together.

When in use the machine may initially be put into operation with the roof 12 raised and once the container 11 is loosely filled with crop the roof 12 may be lowered to lower the deflector vane 58 and bring the pressure charging means 40 into effective operation. This change in operating conditions may be effected without halting the picking up of crop.

In time, the container become filled with compressed crop and that compressed crop may then be ejected rearwardly to stand as a self-sustaining stack.

It has been found that the initial loose fill followed by compression causes the upper layer of crop to be tightly compressed against the roof of the container such that when the compressed stack is discharged from the machine, this tightly compacted layer serves as a thatched roof protecting the remainder of the compressed stack from rain or snow.

I claim:

1. A crop gathering machine comprising means for collecting and discharging previously cut crop, said means having a discharge outlet for the discharge of the collected crop; a container coupled to said means for holding the collected crop in a stack, said container having an opening therein through which crop discharged from said discharge outlet can pass onto said stack; pressure charging means adjacent said container and operable for continuously receiving discharged crop and forcing the same into said container; and discharge guide control means operatively associated with said collecting and discharging means and with said container and pressure charging means for selectively directing crop discharged from said discharge outlet into said opening of the container and into said pressure charging means in selected proportions.

2. A crop gathering machine as claimed in claim 1 wherein said collecting and discharging means includes a chute from which said crop is discharged and said container includes an elevatable roof such that crop discharged from said chute may be directed onto said stack when said roof is elevated.

3. A crop gathering machine according to claim 2 wherein said control means is operatively coupled to said roof so as to operate in concert therewith.

4. A crop gathering machine according to claim 1 wherein said pressure charging means comprises a forwardly directed open top hopper at the front of said container and an oscillating ram element in the lower portion of said hopper for urging crop rearwardly from the hopper into the container.

5. A crop gathering machine comprising a pick-up unit adapted to pick up previously cut crop, said unit having an outlet chute for discharge of the picked up crop, rearwardly, a container having an elevatable roof coupled to said unit such that the crop may be discharged into the container through the top thereof when the roof is elevated, pressure charging means at the front of the container operable for continuously receiving discharged crop and forcing it into the container through a front opening therein, and directional guide means associated with said chute for selectively directing the discharged crop into the top of the container or into said pressure charging means.

6. A crop gathering machine according to claim 5 wherein said directional discharge means is operatively linked to said roof so as to operate in concert therewith.

7. A crop gathering machine according to claim 5 wherein said pressure charging means comprises a forwardly directed open top hopper at the front of said container and an oscillating ram element in the lower portion of said hopper for urging crop rearwardly from the hopper into the container.

* * * * *